May 20, 1952     H. T. HODGES     2,597,324
VARIABLE-SPEED DRIVE
Filed April 3, 1945
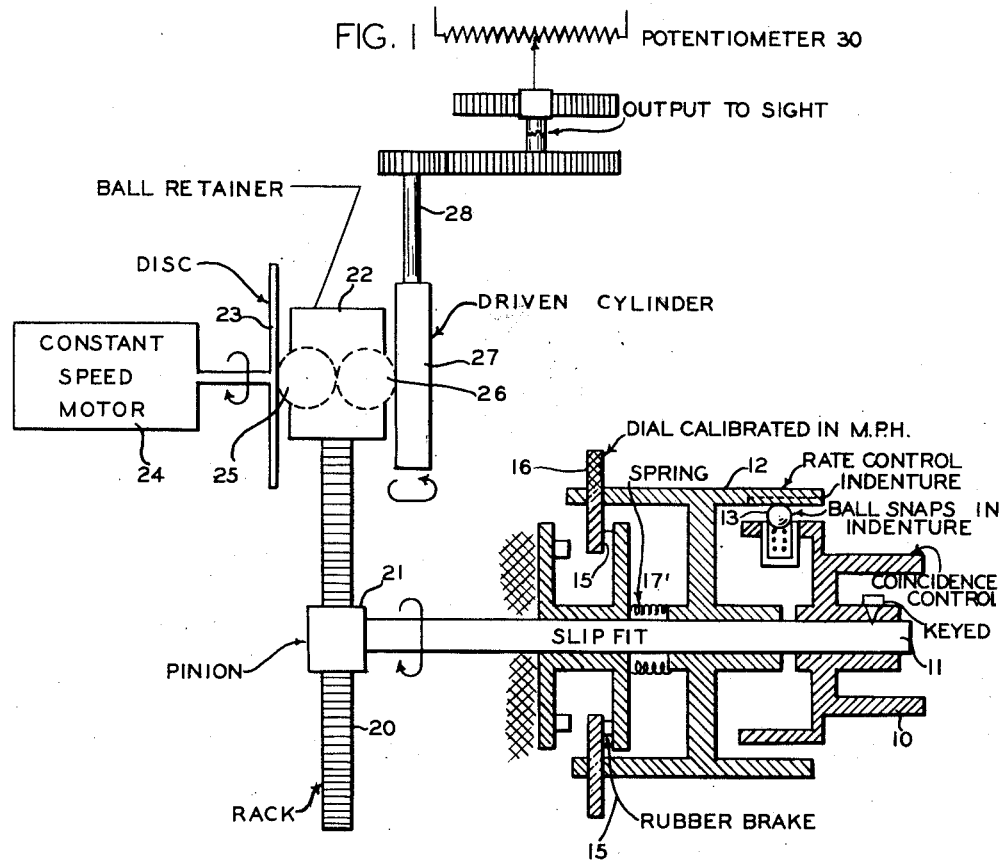
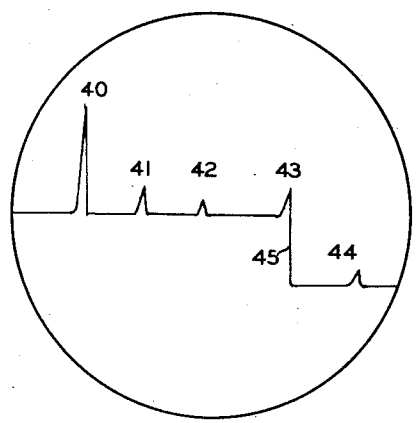
INVENTOR.
HOWARD T. HODGES
BY
    *William D. Hall*
ATTORNEY Patented May 20, 1952

2,597,324

UNITED STATES PATENT OFFICE 2,597,324

VARIABLE-SPEED DRIVE

Howard T. Hodges, Brookline, Mass., assignor, by mesne assignments, to the United States of America as represented by the Secretary of War Application April 3, 1945, Serial No. 586,423

4 Claims. (Cl. 74—1)

This invention relates to a means for directing sights and/or guns toward targets and more particularly to a means for elevating or depressing a gun sight and simultaneously operating a step voltage control potentiometer used in conjunction with an electronic target detection system.

One of the devices for calculating or indicating range is a radar apparatus for transmitting electromagnetic energy and which is adapted to receive energy reradiated or reflected from the target to the apparatus and to give a visual indication of the transmission of the energy in the form of pulses and an indication of the energy received from the target. In order to emphasize the distance between the transmitted pulse and the received energy, this being an indication of the range, a potentiometer arrangement is used to produce a so-called step line which may be superimposed on the desired target pulse as visually shown on the visual reproducer or oscilloscope. Effectively the step voltage controlled by the potentiometer controls the voltage applied to one of the vertical deflection plates on an oscilloscope tube and changes in the step voltage change the position of the base line reproduced on the tube as will be illustrated hereinafter.

When such apparatus is used in conjunction with guns, it is desirable to effect from common driving means changes in the potentiometer associated with the step voltage simultaneously with changes in position of the normal gun sight in order that the change in one will be proportional to the change in the other. Accordingly, it is one of the objects of my invention to provide a device in which this is readily accomplished.

In one of the types of target detection apparatus, applied to and used in conjunction with gun sights, the operator previously has used a hand crank for manually tracking the target necessitating his constant attention in order to keep the step on the oscilloscope tube superimposed or coinciding with the target pulses. Another of the objects of my invention is to provide a combination of an electrical and mechanical means of tracking the target and keeping the target pulse as viewed on the oscilloscope tube and the step line in coincidence once the target has been selected and the apparatus adjusted by the operator, necessitating a readjustment only when the time rate of the approach of the detection apparatus and the target changes.

My invention accomplishes this by means of an electric motor and double-grip rate-displacement control driving the step-control voltage potentiometer and the gun sight shaft such for instance as shown in the application of Edward F. MacNichol, Jr., entitled Electrical Circuits, Serial No. 584,230, filed March 22, 1945, and eliminates the necessity of constant attention by the operator thereby freeing him for other duties such as loading the associated gun. The primary novelty of this mechanism is that simplicity is the keynote in that no differential gear system is used as a displacement means. A ball and disc arrangement is employed for variable translation of a constant speed motor output to drive the step voltage control potentiometer and gun sight.

My invention will best be understood by reference to the drawings in which:

Fig. 1 is a cross section view of the tracking mechanism showing the arrangement of the principal parts of my invention; and Fig. 2 is a plan view of the viewing screen of the oscilloscope tube on the target detection apparatus showing a relative position of the main pulse, target pulse and step line as indicated thereon.

Referring now more particularly to Fig. 1, the "Coincidence control" grip 10 is keyed to the shaft 11, and locked to the larger "Rate control" grip 12 by the spring loaded ball 13 riding in the longitudinal indenture on the inner surface of the "Rate control" grip. The "Rate control" grip is a slide fit on the shaft 11 and is braked from rotating by the action of rubber grommets 15 bearing on the inner surface of a calibrated dial 16 which registers miles per hour and which is an integral part of the "Rate control" grip. The calibrated dial is held firmly against the grommets 15 by the action of a compression spring 17' and as a result of this braking action both grips can be turned simultaneously by pushing in on the "Rate control" grip compressing the spring and releasing the brake, the "Coincidence control" grip 10 being carried along in rotation by action of the spring loaded ball. Likewise the "Coincidence control" grip 10 can be turned by itself being deterred only by the action of the spring loaded ball 13 while the "Rate control" grip 12 is held by the braking action of the rubber grommets 15.

Rotation of shaft 11 changes, by means of a rack 20 and pinion 21 or other conventional means well known to anyone skilled in the art, the relative position of a ball retainer 22 with respect to a driving disc 23 on a constant speed motor 24, and, by means of functional drive with cooperating drive wheels 25 and 26, the driven cylinder 27. Accordingly a change in position of the ball retainer will change the speed of rotation of the driven cylinder 27 and consequently change the speed of rotation of an output shaft 28 which is coupled to the gun sight and step voltage control potentiometer. Likewise for any given position of the ball retainer 22 the speed of rotation of the output shaft will be constant and proportional to the speed of the constant speed driving motor.

Turn now to Fig. 2, which represents a typical picture as presented on the face of the oscilloscope tube viewing screen of the target detection or radar device, wherein a representation of the transmitted or main pulse 40, a plurality of reflected or target pulses 41, 42, 43 and 44 and the range step line 45 is shown. The distance between the main pulse 40 and any of the target pulses is an indication of the distance between the detection apparatus and target at the particular instant, while the distance between the main pulse 40 and the step line 45 is an indication of the range for which the gun sight is set at this same particular instant. Thus it can be seen that when the target pulse 43 and the step line 45 are in coincidence the gun sight is set for the range of this selected target.

In operation, the "Rate control" grip 12 is set at the estimated or indicated airspeed of the plane carrying this apparatus by means of the large dial 13 which is calibrated in miles per hour. When the selected target pulse 43 indicated on the face of the oscilloscope tube associated with the radio object locating apparatus moves into view and coincides with the step line 45 the power is applied to the constant speed motor thereby starting the target tracking. If tracking is proceeding at the proper rate, that is, the target pulse 43 and step line 45 are moving across the face of the oscilloscope tube at the same rate but the target-pulse or echo and step line do not coincide the operator obtains coincidence by increasing or decreasing the rate momentarily by rotating the "Coincidence control" grip 10 until coincidence is obtained and then letting it rotate until the spring load ball 13 slips back into the indenture on the "Rate control" grip 12. Likewise if the tracking rate is not proceeding at the proper speed a new adjustment is obtained by changing the position of the "Rate control" grip 12 thereby changing the tracking rate.

By conventional means, a cam switches the tracking mechanism off when it has run into zero range, but since the "Rate control" is still set, it is only necessary to readjust the "Coincidence control" in order to make a second run at the target as the speed of the plane is not likely to change. Likewise by means of the "Coincidence control" the operator can quickly select and commence tracking another target without disturbing the "Rate control." As is usual in mechanisms of this type, a slewing switch is provided to speed up or reverse the motor when a large displacement of the sight and step voltage control potentiometer is necessary.

It will be appreciated that the illustration of the drawings is for the purpose of showing the inventive concept and that in actual practice there may be modifications made for the sake of particular applications of the invention. For instance the rack and pinion drive of the sliding arm of potentiometer 30 would be subject to change in specific arrangement.

Also, even though the description of operation of my invention has referred to the application for use on an aircraft, it is to be understood that it can be readily adapted for use with a gun sight and associated gun either stationary on the ground or mounted on a ship or land vehicle for use against moving air or seaborne targets.

While there has been described what is at present considered to be the preferred embodiment of this invention, it will be obvious to those skilled in the art that various changes and modifications may be made therein without departing from the scope of the invention as set forth in the appended claims.

I claim:

1. A variable speed drive comprising: driving means; a disc-like member connected to said driving means; means frictionally driven by said disc-like member and in turn coupled to a member to be driven, said means comprising at least one ball held in a retainer that is displaceable with respect to the center of said disc-like member; rotatable means coupled to said retainer for displacement thereof, thereby to vary the speed at which said member is driven; a first control grip keyed to said rotatable means for manual rotation thereof; a rate control grip slidingly enclosing said rotatable means and releasably braked against rotation thereby; and ball means coupling said grips and adapted to snap into an indenture within said rate control grip, whereby said first control grip is separately rotatable when said rate control grip is braked and varies the speed of said member, said last-named ball means and indenture serving to indicate the original position of said first control grip as well as to rotate said first control grip when said rate control grip is unbraked and rotated.

2. The drive of claim 1, further including dial means connected to said rate control grip, said dial means indicating the angle of rotation of said rotatable means, said angle being directly proportional to the speed at which said member is driven.

3. Apparatus for rotating a shaft, comprising: a first grip keyed to said shaft for rotation thereof; a second grip slidably disposed about said shaft said first grip and releasably braked against rotation thereby; and means for releasably interconnecting said grips, whereby said first grip serves to rotate said shaft while said second grip is braked, said means for releasably interconnecting said grips serving to indicate the original position of said first grip, and said second grip when unbraked and rotated serving to rotate said first grip and therefore said shaft.

4. The apparatus of claim 3, wherein said interconnecting means comprises ball means within said first grip and adapted to be disposed within an aperture within said second grip.

HOWARD T. HODGES.

REFERENCES CITED

The following references are of record in the file of this patent:

UNITED STATES PATENTS

| Number | Name | Date |
|---|---|---|
| 1,461,521 | Forney et al. | July 10, 1923 |
| 1,707,274 | Morse | Apr. 2, 1929 |
| 2,438,045 | Gerhardt et al. | Mar. 16, 1948 |
| 2,446,754 | Garrett et al. | Aug. 10, 1948 |
| 2,498,835 | Brotman | Feb. 28, 1950 |

FOREIGN PATENTS

| Number | Country | Date |
|---|---|---|
| 256,480 | Great Britain | Aug. 12, 1926 |